(No Model.) 2 Sheets—Sheet 1.
M. WEINRICH.
APPARATUS FOR DECARBONIZING AND FOR REVIVIFYING BONE BLACK.
No. 530,632. Patented Dec. 11, 1894.
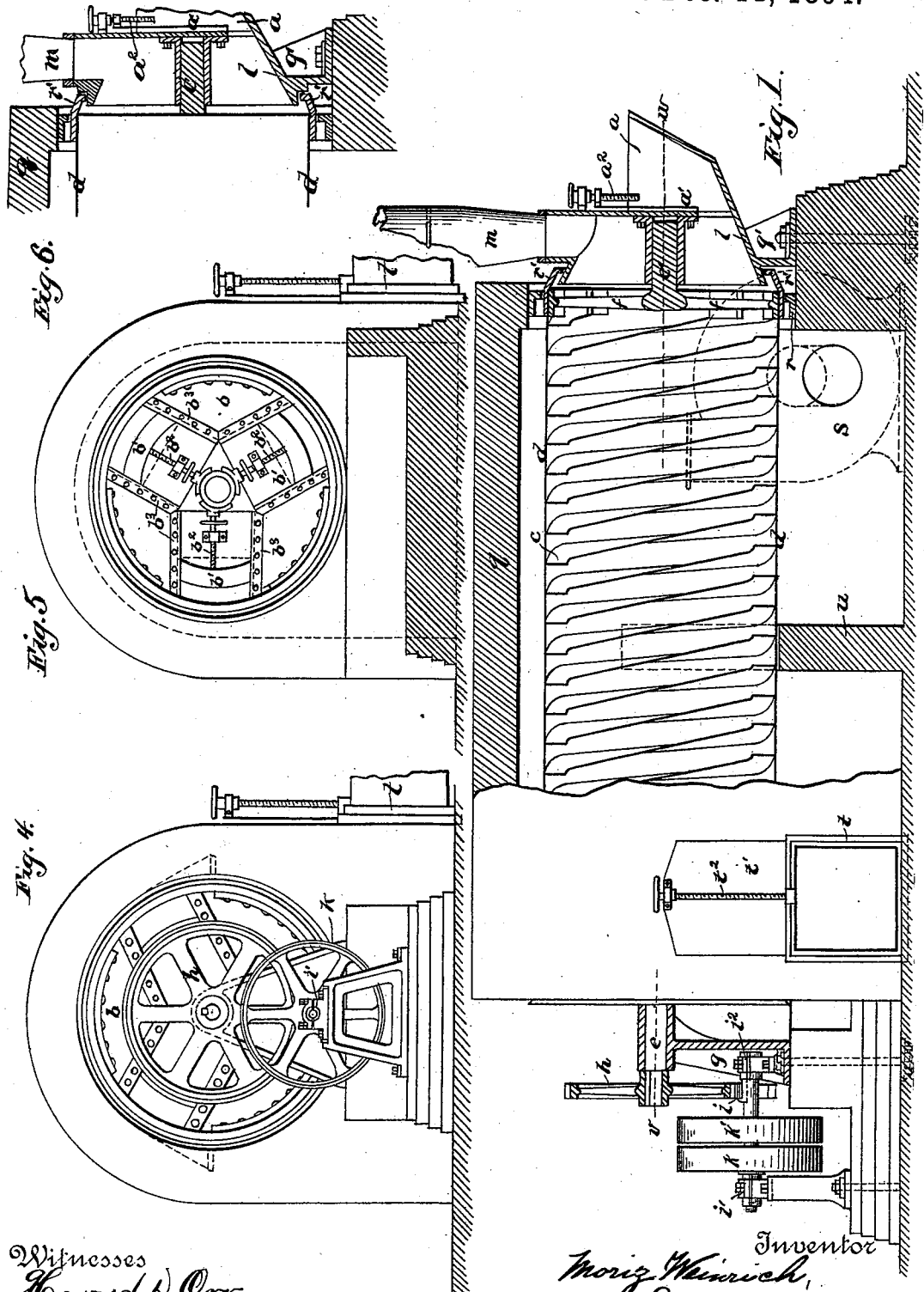
Witnesses
Howard D. Orr.
H. S. Shepard
Inventor
Moriz Weinrich,
by John J. Halsted & Son.
his Attorneys (No Model.) 2 Sheets—Sheet 2.
M. WEINRICH.
APPARATUS FOR DECARBONIZING AND FOR REVIVIFYING BONE BLACK.
No. 530,632. Patented Dec. 11, 1894.
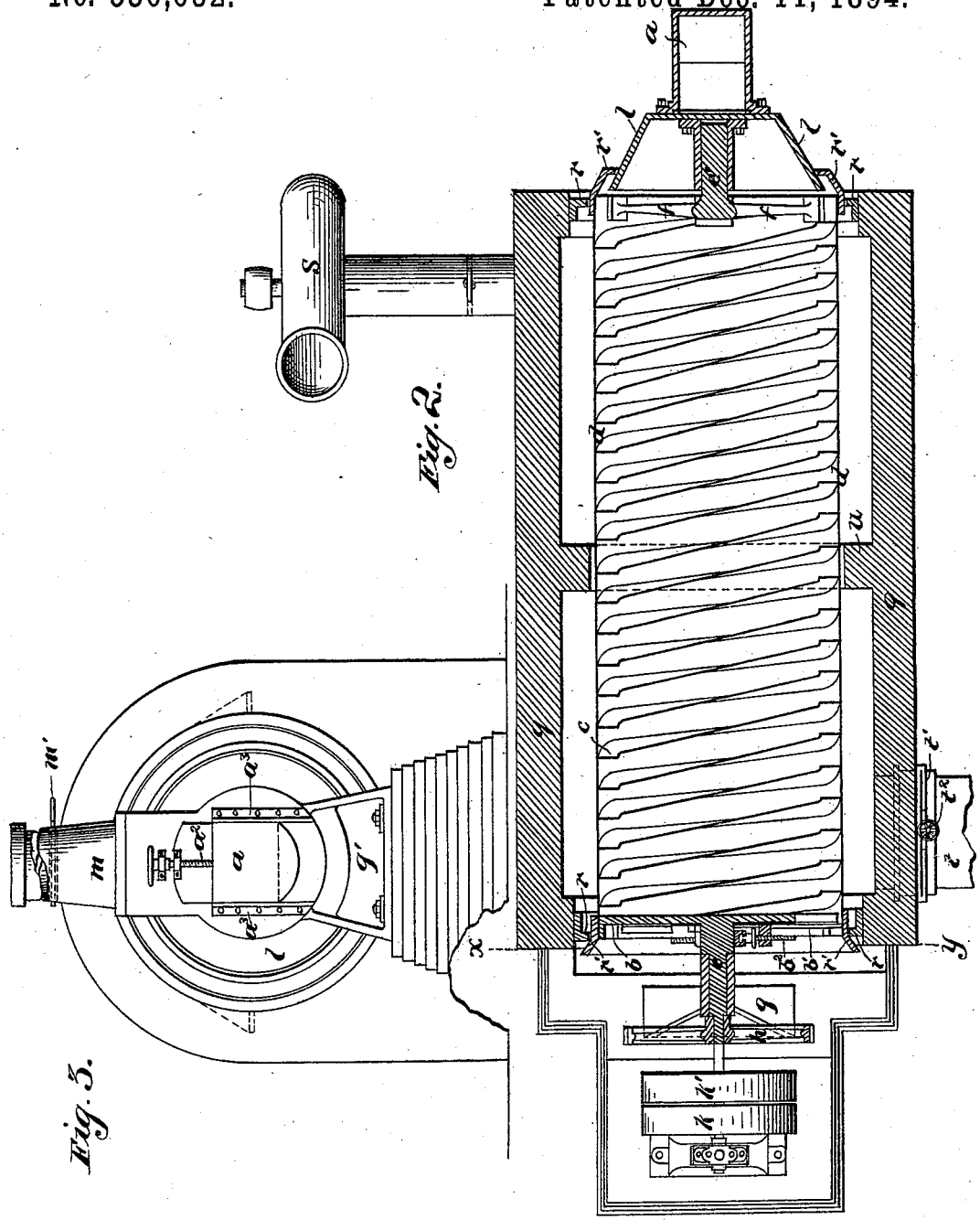

UNITED STATES PATENT OFFICE.

MORIZ WEINRICH, OF ST. LOUIS, MISSOURI.

APPARATUS FOR DECARBONIZING AND REVIVIFYING BONE-BLACK.

SPECIFICATION forming part of Letters Patent No. 530,632, dated December 11, 1894.

Application filed December 6, 1893. Serial No. 492,909. (No model.)

*To all whom it may concern:*

Be it known that I, MORIZ WEINRICH, of St. Louis, in the State of Missouri, have invented certain new and useful Improvements in Apparatus for Decarbonizing and for Revivifying Bone-Black; and I do hereby declare that the following is a full, clear, and exact description of the invention, which will enable others skilled in the art to which it appertains to make and use the same, reference being had to the accompanying drawings, and to letters of reference marked thereon, which form a part of this specification.

In the specification of my United States Patent No. 509,460, dated November 28, 1893, I mention as a preparatory proceeding in the regeneration of spent boneblack, the removal of the old carbon contained in such boneblack by heating it under admission of air until the carbon is burned and only the mineral framework left. In order to perform this in a well-regulated way I have invented an apparatus as shown in the accompanying drawings.

Figure 1, is an elevation partly in longitudinal vertical section; Fig. 2, a horizontal section in the line $v. w.$ of Fig. 1. Fig. 3. is a front view; Fig. 4, a rear end view; Fig. 5, a section in the line $x. y.$ of Fig. 2., and Fig. 6, a detail showing a variation in the head.

The apparatus consists in its main part of the drum $d$, made of sheet iron, and which, according to the amount of boneblack destined to be treated in a given time, may have a length of appropriate size, say for instance, of from twelve to thirty feet, and a diameter of from three to five feet. The inner side of the drum is provided with a helix or Archimedean screw $c$. made of sheet iron, projecting inwardly say four to six inches, its threads or ribs being four to six inches wide, the purpose of such screw being to move constantly the boneblack entering at the front of the slowly revolving drum, toward its rear or end.

The drum is connected at its lower or rear end with screws or rivets to the iron frame $b$, which is fastened to the short shaft or hub $e$. This frame is provided with the radial shutters or dampers $b'$. having adjusting screws $b^2$. and adapted to slide in appropriate guides $b^3$., in order to regulate the draft of air passing through the interior of the drum, and out through openings at the rear or discharging end of the same, such openings or outlets being controllable by these shutters: and the char when sufficiently treated also passes out through the same openings.

At its front end the drum is connected to the cast iron wheel $f$. which is fastened to the hub $e'$. The hubs $e.$ $e'$. rest and revolve upon the supports $g'$ and $g'$, respectively.

If the length of the drum exceeds say sixteen feet, it should be further supported as for instance in the interior for the sake of greater firmness, by additional wheels like $f$. and which if desired, may be fixed upon a shaft extending through the whole length of the drum, and such an additional wheel may run on its outside upon rollers resting upon the bridge wall $u$.

At the end of shaft $e$. is a cog wheel $h$. which gears with the pinion $i$. whose shaft is mounted in suitable bearings $i'. i^2$. as shown, and is set in motion or stopped by the fast pulley $k$. and the loose pulley $k'$. respectively.

The support $g'$. at the front part of the apparatus is connected with the conical head $l$. made of cast iron, and turned smooth at the edge and around which runs closely the cast iron ring $r'$. turned smooth likewise at its edge, to be mentioned again hereinafter.

With the head $l$. is connected the hopper $a$, provided with the sliding shutter $a'$. adjustably controlled by screw $a^2$., and sliding in guides $a^3$. Through this hopper is fed the boneblack, its inflow being regulated by the shutter $a'$.

$m$ is a pipe with a damper $m'$ by which the draft of air passing through the interior of the drum, is regulated and may be connected with the pipe leading out of the fan located at $s$. and hereinafter mentioned.

The whole drum except at its ends, is walled in with brickwork $q$. In order to prevent the air from entering between the brick wall and the drum, the drum is provided on both ends with rings of cast iron, $r., r'$. The rings $r$. provided with lugs, are let into the wall and turned smooth at the inner sides, and the rings $r'$. are fastened to the drum and turned smooth on their outside. A play of only one eighth of an inch is allowed between these turned sides or faces of the rings.

The apparatus is set up in proximity to a furnace or some other source of heat, its hot gases being led through a flue $t$. provided with the damper $t'$. and located under the rear end of the drum.

The apparatus works as follows:—The drum is started by the fast pulley $k$, the hopper $a$. is filled with boneblack, the fan $s$. is set in motion, and the damper $t$. is lifted say by means of an adjusting screw $t^2$. The gases are drawn by the fan under the slowly revolving drum, which should make from two to five revolutions per minute: and these gases come against the bridgewall $u$., surround the drum in the space inclosed between it and the wall $q$. and heat the whole drum, and are drawn off through the fan $s$. and may be used yet for drying the wet boneblack. The boneblack falls in an equal stream regulated by the sliding shutter $a'$, into the interior of the drum. It is heated there at once, and moves slowly and continuously by the threads of the helix $c$. toward the other end of the drum. The heated particles of the boneblack change constantly their position becoming simultaneously exposed to the air which passes through the drum, so that the carbon will burn off wholly or partly, as desired, without bringing the boneblack to a red heat. The bone black being thus deprived of more or less of its carbon is discharged at the lower or rear end of the drum, and is thence carried off by any convenient means or devices. The amount of carbon desired to be burned off can be easily regulated: either, first by the amount of boneblack passing through the sliding shutter; or second by the temperature of the gases drawn around the drum; or third by the amount of air drawn through the drum; or fourth by the number of revolutions of the drum, in a given time.

In place of a helix may be used a number of longitudinal ribs made of sheet iron projecting inwardly six to twelve inches, for the purpose of lifting and dropping constantly the heated boneblack. In this case the drum should have a slight incline, say of about one inch to six feet of its length. Although the heated boneblack becomes in this way more thoroughly exposed to the air than by a helix, so that the carbon burns off more readily, I generally prefer a helix, especially for small grain boneblack, since by its use the boneblack is better preserved and none of its mineral frame work rubbed off.

I have found that such apparatus as I have described, may be substituted to great advantage and in a quite novel way, for the revivifying-kilns for boneblack heretofore used.

As generally known to those versed in the art, the usual object of revivifying kilns, is to char under careful exclusion of air, the organic matters absorbed by the boneblack during the filtration of sugar-solutions or other solutions, whereby the carbon formed by these organic matters gradually chokes and covers the pores of this boneblack. By a careful use of my apparatus in the described way, these organic matters instead of being charred under exclusion of air, can be entirely burned off under admission of air, thus leaving the pores of the boneblack always clean and effective, besides requiring only a very moderate heat by which the mineral frame work of the boneblack remains quite uninjured.

This mode of revivification is especially to be recommended if the boneblack contains more than ten per cent. of carbon, so that its efficacy would not be impaired if sometimes a small amount of carbon should be burned off together with the foreign organic matters.

It will be observed that the drum has no fire or furnace beneath it, which would generate too high a temperature for my process: and that the drum is made of sheet iron, which would soon be destroyed by such a fire or furnace.

I claim—

1. An apparatus adapted for decarbonizing and for revivifying bone-black without charring the same, having in combination a horizontal or nearly horizontal, revoluble drum into which atmospheric air is admitted and provided with interior projecting ribs, a wall surrounding such drum, means for regulating the continuous draft of air through the drum, and a flue for admitting hot air or gases from an extraneous source of supply into the space beneath such drum, all substantially as set forth.

2. An apparatus adapted for decarbonizing and for revivifying bone-black without charring the same, having in combination a horizontal or nearly horizontal, revoluble, sheet iron drum into which atmospheric air is admitted, and provided with interior projecting ribs, a wall surrounding such drum, means for regulating the continuous draft of air through the drum, and a flue provided with a damper, and located under the rear end of the drum, and serving to supply and admit from a furnace or other outside source of heat all the heat required, all substantially as set forth.

MORIZ WEINRICH.

Witnesses:
C. C. HARTMAN,
ARTHUR BUCHROEDER.